(12) United States Patent
McLean et al.

(10) Patent No.: US 7,300,100 B2
(45) Date of Patent: Nov. 27, 2007

(54) WINDROWER CAB MOUNTING AND SUSPENSION SYSTEM

(75) Inventors: Kenneth W. McLean, New Holland, PA (US); Donald L. Osborne, Quarryville, PA (US); David M. DeChristopher, Akron, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/969,892

(22) Filed: Oct. 21, 2004

(65) Prior Publication Data

US 2006/0096269 A1    May 11, 2006

(51) Int. Cl.
    *B60R 27/00*      (2006.01)

(52) U.S. Cl. .......................... 296/190.07; 296/190.04; 180/89.12; 180/89.13; 180/89.14

(58) Field of Classification Search ........... 296/190.04, 296/190.07, 190.05, 190.06, 35.1, 35.2; 180/89.12–89.15; 56/228, 1, 10.1, 14.7, 192, 320.1
See application file for complete search history.

(56) References Cited

U.S. PATENT DOCUMENTS

| | | | | |
|---|---|---|---|---|
| 3,554,596 A | * | 1/1971 | Le Fevre | 296/190.05 |
| 3,841,694 A | * | 10/1974 | Merkle | 296/35.1 |
| 3,966,009 A | | 6/1976 | Meacock, II et al. | 180/89 |
| 4,061,393 A | | 12/1977 | Blomstrom | 296/28 C |
| 4,275,918 A | | 6/1981 | Franco | 296/190 |
| 4,452,329 A | | 6/1984 | Stone et al. | 180/89.15 |
| 4,470,477 A | * | 9/1984 | Marjoram | 180/89.14 |
| 4,638,878 A | | 1/1987 | Komp | 180/89.13 |
| 4,989,684 A | * | 2/1991 | Conaway | 180/89.15 |
| 5,044,455 A | * | 9/1991 | Tecco et al. | 180/89.13 |
| 5,398,774 A | | 3/1995 | Nilsson et al. | 180/89.14 |
| 5,553,911 A | * | 9/1996 | Bodin et al. | 296/190.07 |
| 5,633,452 A | * | 5/1997 | Bebernes | 73/37 |
| 6,073,714 A | | 6/2000 | McHorse et al. | 180/89.14 |
| 6,168,229 B1 | | 1/2001 | Kooi et al. | 296/190.07 |
| 6,478,102 B1 | * | 11/2002 | Puterbaugh et al. | 180/89.12 |
| 6,540,283 B1 | | 4/2003 | Johansson et al. | 296/190.05 |
| 6,598,932 B2 | | 7/2003 | Gross et al. | 296/190.07 |
| 6,619,728 B1 | | 9/2003 | Kummel | 296/190.07 |
| 6,758,294 B2 | * | 7/2004 | Peddycord et al. | 180/89.12 |
| 2004/0080181 A1 | | 4/2004 | Puterbaugh et al. | 296/190.01 |

FOREIGN PATENT DOCUMENTS

WO     WO 93/19973     10/1993

\* cited by examiner

*Primary Examiner*—Thomas B. Will
*Assistant Examiner*—Alicia Torres
(74) *Attorney, Agent, or Firm*—Patrick M. Sheldrake; John William Stader; Michael G. Harms

(57) ABSTRACT

A cab mounting and suspension system for an agricultural windrower that uses pivoting elastomeric mounts on the front corners of the cab and coil-over shock absorbers on the rear corners. A stabilizing bar is mounted on elastomeric isolators and located between the cab and the windrower frame across the back of the cab. The bar extends the full width of the cab to reduce the amount of movement of the cab from side to side as the rear pivots up and down through the range of the coil-over shocks.

13 Claims, 6 Drawing Sheets

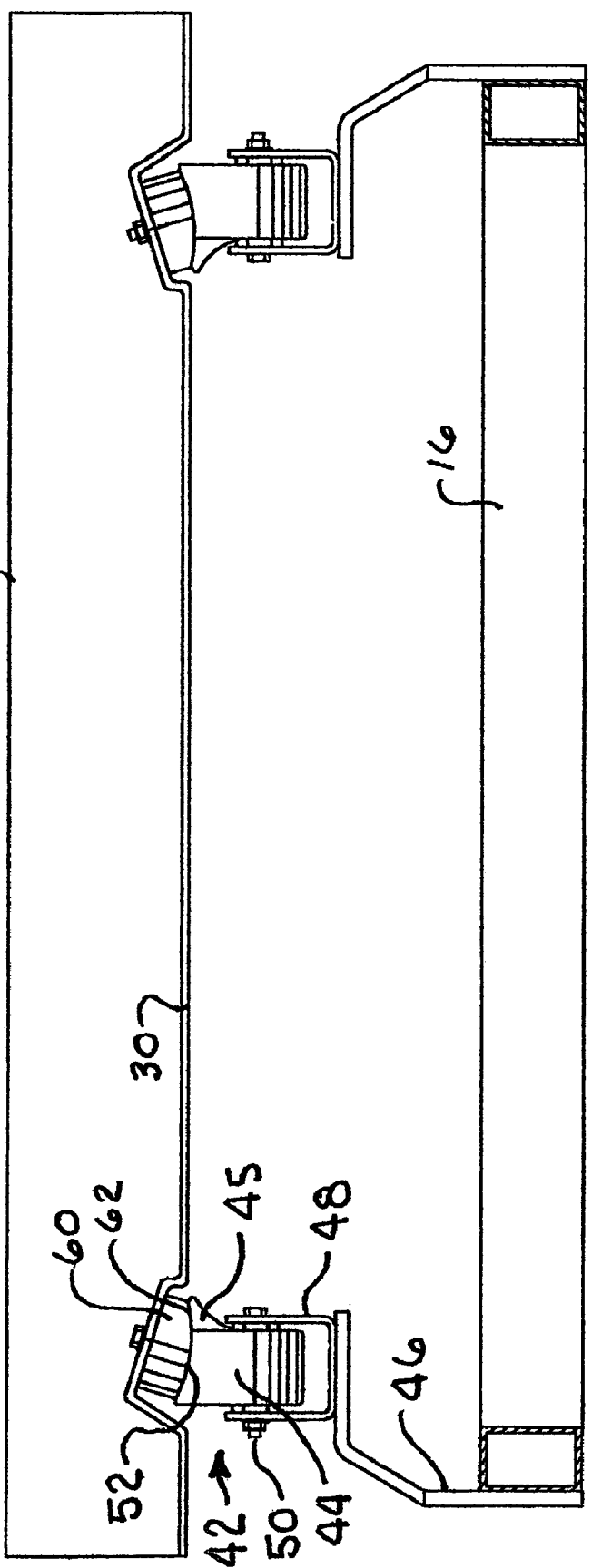

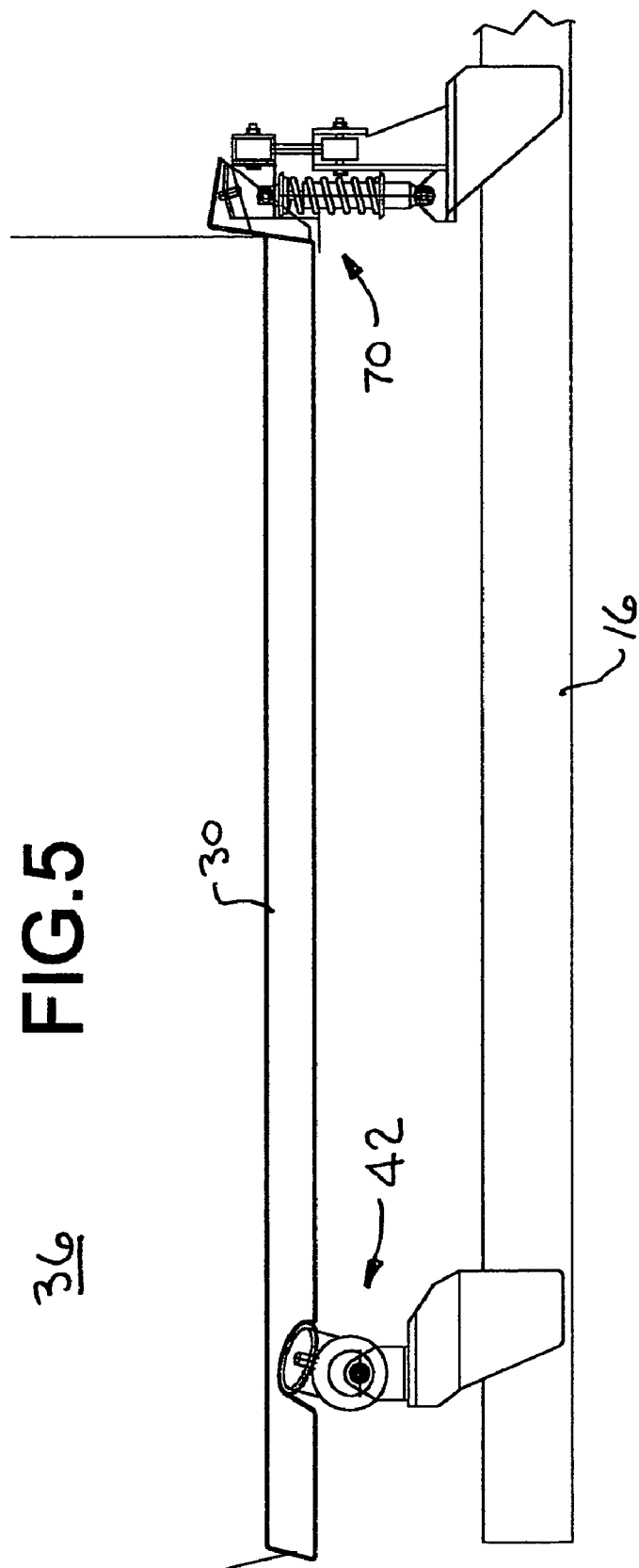

WINDROWER CAB MOUNTING AND SUSPENSION SYSTEM

BACKGROUND OF THE INVENTION

The present invention relates generally to agricultural self-propelled windrowers, and more particularly to a cab mounting and suspension system for such machines.

Self-propelled windrowers have been used in farming operations for several decades. Generally, the self-propelled windrower is designed to cut and process hay and other crops. More specifically, a windrower of the type under consideration here includes a tractor and a separate header. The tractor has a pair of drive wheels on the forward end and a pair of pair of tricycle-like wheels on the rear end. The wheels support a main frame that carries the engine between the wheel pairs and a drive train. A cab provides an enclosed environmentally controlled operator's platform generally above the drive wheels. A variety of crop-harvesting headers are selectively attachable to the forward end of the unit to provide the operator with a choice of tools with which to handle the crops.

In the case of self-propelled agricultural vehicles, the vehicle operator is to be protected from jolts, shaking, and vibrations occurring in travel over rough terrain or are caused by the engine and other components. Substantially every obstacle encountered by the wheels transmit a "bounce" or vibration directly through the chassis to the operator's platform, making the ride uncomfortable and tiring, and thus resulting in lower field operation speeds. To counteract these effects, elastomeric mounting systems are conventionally used at each of the four corners of the cab between the cab frame and the windrower frame. These mounts are focalized at the approximate center of gravity of the cab assembly or, more particularly, at the operator's head. While providing some cushion for the cab structure and the operator, the shock of rough field conditions are still transferred through the mounts creating fatigue for the operator and cab structure failures.

It would be a significant advantage in this technology to solve the above-identified problems by providing a cab mounting and suspension system that provides a more comfortable ride for the operator and fewer vibration-originating structural failures during field operation, with higher operation speeds.

SUMMARY OF THE INVENTION

Accordingly, it is an object of the present invention is to provide a self-propelled windrower cab mounting and suspension system.

Another object of the present invention is to provide a cab mounting and suspension system for an agricultural windrower that efficiently and effectively permits faster operating speeds than previously known.

Another object of the present invention is to provide a cab mounting and suspension system for an agricultural windrower that greatly reduces the stress in the cab weld assembly, reducing joint weld failures in the cab.

It is another object of the present invention to provide a cab mounting and suspension system for a windrower that employs a pivoting elastomeric mount between the windrower and the cab frame that allows the cab structure to rotate about the mounting axis.

Yet another object of the present invention is to provide a cab mounting and suspension system for a windrower that uses coil-over shock absorbers at the rear corners of the cab between the respective frame members to provide a cushion for rough conditions.

It is yet another object of the present invention to provide a cab mounting and suspension system for a windrower that uses a stabilizer bar between the cab and the windrower frame across the back of the cab to reduce the amount of movement of the cab from side to side as the rear pivots up and down through the range of the coil-over shocks.

It is yet another object of the present invention to provide a cab mounting and suspension system for a windrower that requires no adjustments or operator input.

It is a still further object of the present invention to provide a cab mounting and suspension system that is durable of construction, inexpensive of manufacture, carefree of maintenance, facile in assemblage, and simple and effective in use.

These and other objects are attained by providing a cab mounting and suspension system for an agricultural windrower that uses pivoting elastomeric mounts on the front corners of the cab and coil-over shock absorbers on the rear corners. A stabilizing bar is mounted on elastomeric isolators and located between the cab and the windrower frame across the back of the cab. The bar extends the full width of the cab to reduce the amount of movement of the cab from side to side as the rear pivots up and down through the range of the coil-over shocks.

DESCRIPTION OF THE DRAWINGS

The advantages of this invention will be apparent upon consideration of the following detailed disclosure of the invention, especially when taken in conjunction with the accompanying drawings wherein:

FIG. 3 is a partial sectional view of the bottom assembly of the cab, taken along line 3-3 of FIG. 2, also showing a portion of the main frame to which the cab is attached;

FIG. 5 is a partial sectional view of the bottom assembly of the cab, taken along lines 5-5 of FIG. 2.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
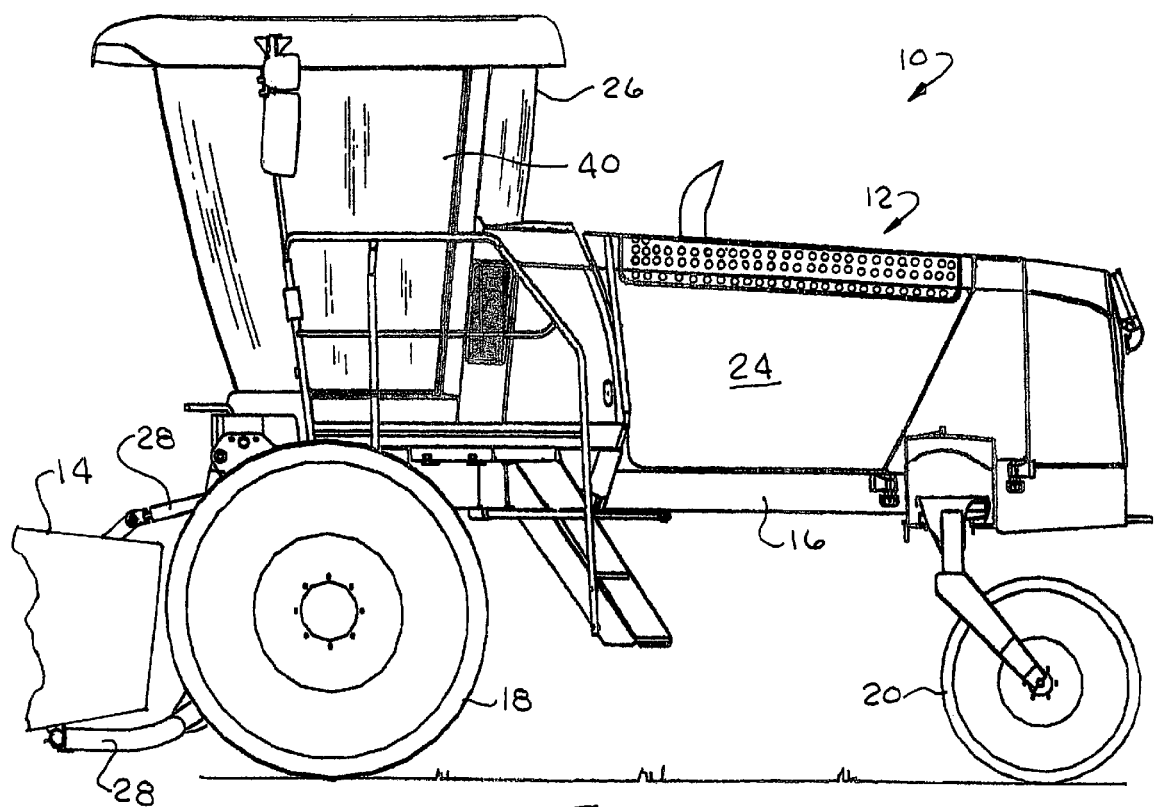
FIG. 1 is a side plan view of a windrower, with header.

FIG. 1 shows the two primary components of a self-propelled windrower 10, i.e., tractor 12 and header 14. Tractor 12 has a main frame 16, with a longitudinal horizontal axis from front to back, that is supported by a pair of drive wheels 18 (only one shown) on the forward portion thereof and a pair of rear wheels 20 adjacent the rear end. Main frame 16 includes longitudinal and lateral structural elements that provide a fairly rigid and structurally strong skeletal assembly for the support of the various components. An engine, located under cowling 24, a transmission and other components, all well known in the art, are supported on the main frame 16 and provide the power necessary for the machine to operate. A cab 26, also supported on the main frame, encloses the operator's platform to provide an environmentally controlled location from which the windrower may be comfortably operated.

Header 14 may be of several designs, but typically comprises a cutting mechanism, either a sicklebar or rotary cutter, a feeder mechanism and conditioning rolls. The header is supported by a hydraulic lift and flotation structure 28 that may be activated to selectively raise or lower the header between transport and operational positions. It is significant to note here that the rotary cutter operates at such speed and efficiency that operational speed of the windrower is limited not so much by the efficiency of the header, but more so by the comfort of the operator and the long term integrity of the windrower itself. The cab mounting and suspension system on the typical self-propelled windrower is such that bumps and irregularities in the field are directed through the chassis to the operator. The higher the speed of the windrower, the more stress the chassis is subjected to, and the more discomfort experienced by the operator. The cab mounting and suspension system to be described herein reduces this stress and discomfort, making it possible to operate the windrower at a higher ground speed and thus greater crop throughput.

Cab 26 is typically a four-sided structure, somewhat like a rectangular box with top and bottom assemblies. The sides may slope outwardly, especially the front portion, to increase the size of the operator's workspace without enlarging the footprint. In its simplest form, the cab would comprise four upright panel assemblies, with considerable glass to provide visual access to as much of the field or surrounding area as possible, a door, a roof and a floor or bottom assembly. The bottom assembly is conventionally attached to the main frame 16 of the windrower, and may comprise several configurations, that may include structural components at various locations such as along the lower portion of the cab. Inside the cab there are located various necessary components such as a seat and a steering wheel, and various additional systems for operator comfort such as, for example, a heater and an air conditioner.

Figure 2:
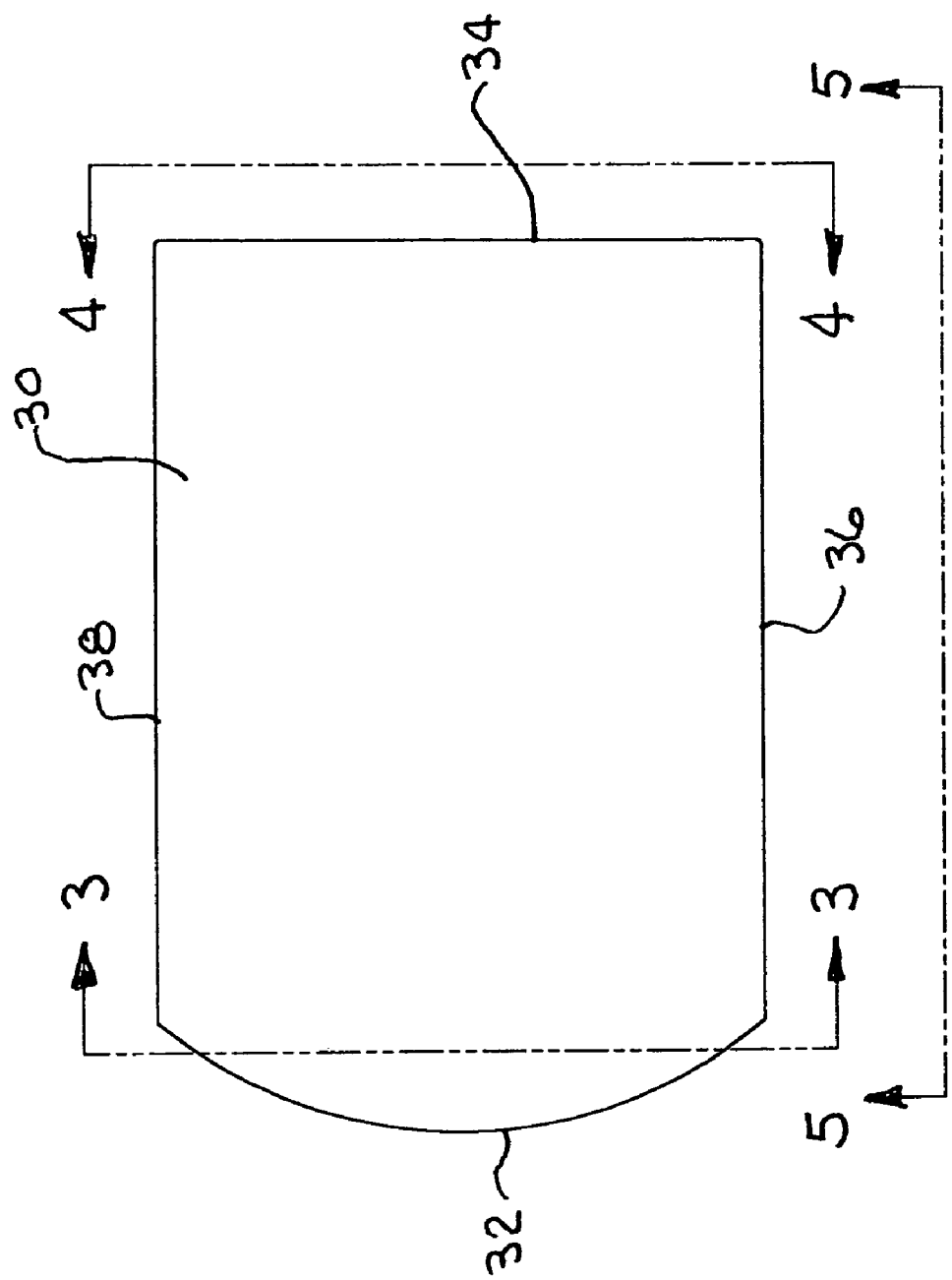
FIG. 2 is partial top plan view of the bottom assembly of the cab.

FIG. 2 shows an exemplary bottom assembly 30, or floor of cab 26, to have a generally rectangular shape with a curved front panel assembly 32. There is a back panel assembly 34 and two opposing side panel assemblies 36 and 38. A door 40 (FIG. 1) is located in one of the side panel assemblies, and it is possible that each side panel assembly would have a door located in it, depending upon the designer's preferences and the operational requirements of the windrower.

FIG. 3 depicts the front mounting and suspension of the cab 26. Each of the two front corners formed by bottom assembly 30, front panel assembly 32, side panel assembly 36 and side panel assembly 38 is attached to main frame 16 by a pivoting elastomeric mount 42. A generally cylindrically-shaped lower portion 44, with an upper extension 45, is affixed to a brace 46, itself affixed to main frame 16, by a yoke 48 and pivot pin 50. The pin may be either loose fitting or tight. If loose fitting, lower portion 44 rotates about pin 50 and slightly flexes due to the elastic characteristics of the material of which mount 42 is made in substantially any direction in the plane of the bottom assembly 30. Extension 45 protrudes from the side of portion 44 and forms a part thereof to increase the volume of material at the interface 52 between lower portion 44 and upper portion 60. If the pin is tightly clamping the lower portion 44, as is preferred, all of the pivoting occurs in the elastomeric material.

Figure 3A:
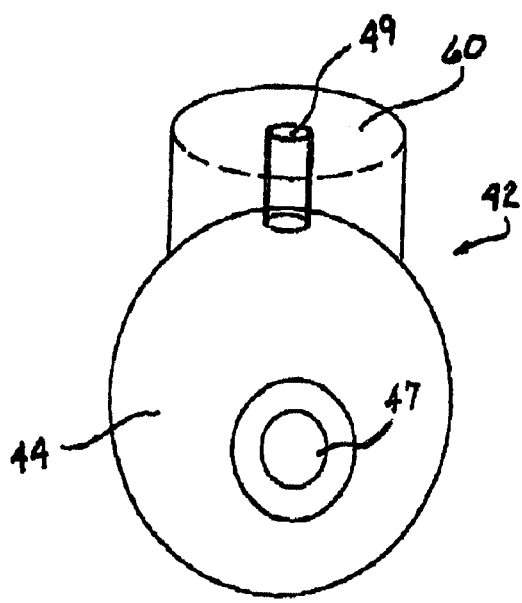
FIGS. 3A and 3B are detailed views of the side and front of the pivoting elastomeric mount.
Figure 3B:
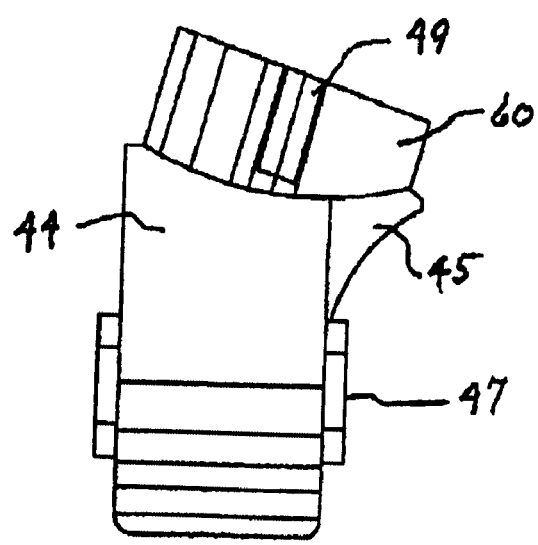

As can be seen in FIGS. 3A and 3B, lower portion 44 has an off-center opening 47 through which pin 50 extends to pivotably affix mount 42 to yoke 48. The term "off-center" is relative to the central axis of lower portion 44, which is, as seen in FIG. 3A, circular. The pivoting movement is, in the embodiment where the pin 50 loosely clamps portion 44, thus not limited to rotation about pin 50, but also includes exaggerated flexure above the axis of pin 50 due to the off-center position of the pin. A threaded insert 49, integrally formed with mount 42, allows the mount to be bolted to bottom 30.

Pivoting elastomeric mounting assembly 42 further includes an upper elastomeric portion 60 which is generally cylindrical in configuration. The upper and lower portions are integrally formed at an angle for structural and function purposes as discussed above.

Mount 42 is made from an elastomeric material so that it can absorb a certain amount of shock through compression, expansion (stretching) and flexure. The preferred material is rubber, but substantially any relatively hard elastomeric material will perform the necessary function.

Figure 4:
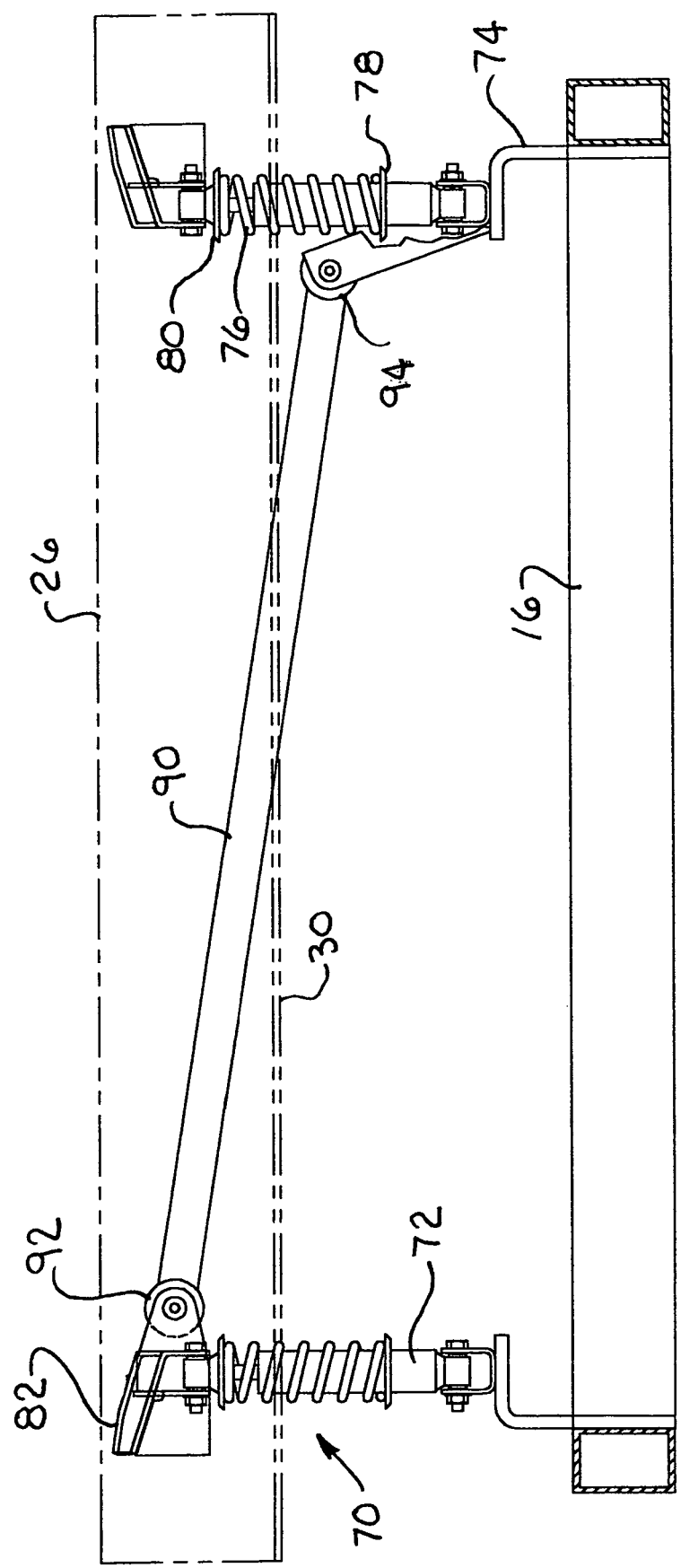
FIG. 4 is a partial sectional view of the bottom assembly of the cab, taken along line 4-4 of FIG. 2, also showing a portion of the main frame to which the cab is attached.

FIG. 4 depicts the rear mounting and suspension of the cab 26. Each of the two rear corners formed by bottom assembly 30, rear panel assembly 34, side panel assembly 36 and side panel assembly 38 is attached to main frame 16 by a coil-over shock mounting assembly 70. A shock absorber 72 is affixed to a brace 74, itself affixed to main frame 16. A compression spring 76 is positioned around the barrel of shock absorber 72 and held in place by upper and lower stops 78, 80, affixed to shock absorber 72. The upper end of assembly 70 is affixed to bottom assembly 30 by bracket 82. Ideally, the coil-over shock assembly can compress approximately two inches and extend approximately one inch.

Also located between the cab 26 and windrower main frame 16 across the back of the cab is a stabilizer bar 90. The stabilizer bar is mounted in pivoting rubber isolators 92, 94. Bar 90 extends the full width of the cab to reduce the amount of movement of the cab from side to side as the ear pivots up and down through the range of the coil-over shocks. There are no adjustments or operator inputs required of this system, as it functions fully automatically once installation is completed. The biggest advantage of this cab mounting and suspension system in the windrower application is operator comfort, allowing higher ground speed for the unit. Also, the stress is greatly reduced in the cab weld assembly resulting in fewer joint weld failures in the cab.

FIG. 5 is a side view of the lower part of cab 26. It shows the relative positions of the front pivoting elastomeric mount 42 and the coil-over shock mounting assembly 70. The left and right sides are essentially the same.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. An agricultural windrower with a longitudinal axis extending between front and opposing rear ends, front and rear wheel pairs supporting a main frame, an engine and drive system supported by said main frame to supply motive power to said front wheel pair, an operator's cab supported on said main frame adjacent said front end of the windrower, said cab generally formed as a rectangular box-like structure with a top assembly and an opposing bottom assembly, first and second opposing side panel assemblies, a front panel assembly and an opposing rear panel assembly, and a door in one of said side panel assemblies for ingress and regress, said bottom, side and front panel assemblies forming two front corners, said bottom, side and rear panel assemblies forming two rear corners, and a cab mounting and suspension system comprising:

first and second pivoting elastomeric mounts interconnecting said bottom assembly of said cab, one adjacent each of said two front corners, to said main frame, each said first and second pivoting mounts having an upper elastomeric portion and an integral lower elastomeric portion, each said portion further having a central axis wherein said upper elastomeric portion and said lower elastomeric portion are integrally formed and said central axes are angled with respect to one another, said lower elastomeric portion connected to said main frame, said lower elastomeric portion further having opening therethrough, said opening being disposed along an axis generally offset from and parallel to said central axis in said lower elastomeric portion and generally parallel to a line generally parallel to said two front corners, said elastomeric mounts constructed so as to allow flexure of the mounts in substantially any direction, especially pivotal;

first and second yokes rigidly affixed to said main frame, one adjacent each of said two front corners, with a pin extending through respective each said off-center opening connecting said first and second pivoting mounts to respective yokes; and first and second shock absorber mechanisms interconnecting said bottom assembly of said cab, one adjacent each of said two rear corners, to said main frame.

2. The windrower of claim 1, wherein:
each said first and second shock absorber mechanism includes a coil-over shock absorber.

3. The windrower of claim 2, wherein:
said elastomeric mounts comprise rubber.

4. The windrower of claim 3, further including:
a stabilizer bar having first and second opposing ends, said first end of said stabilizer bar pivotably attached to the rear panel assembly of said cab adjacent said first shock absorber mechanism and said second end of said stabilizer bar pivotably attached to said main frame adjacent said second shock absorber mechanism.

5. The windrower of claim 4, further including:
elastomeric isolators affixed to said first and second ends of said stabilizer bar and attached to said rear panel assembly of said cab and said main frame, respectively, to provide said pivotable attachment.

6. The windrower of claim 1, further including:
a stabilizer bar having first and second opposing ends, said first end of said stabilizer bar pivotably attached to the rear panel assembly of said cab adjacent said first shock absorber mechanism and said second end of said stabilizer bar pivotably attached to said main frame adjacent said second shock absorber mechanism.

7. The windrower of claim 6, further including:
elastomeric isolators affixed to said first and second ends of said stabilizer bar and attached to said rear panel assembly of said cab and said main frame, respectively, to provide said pivotable attachment.

8. The windrower of claim 7, wherein:
each said first and second shock absorber mechanism includes a coil-over shock absorber.

9. The windrower of claim 8, wherein:
said elastomeric mounts comprise rubber.

10. An agricultural windrower with a wheel-supported main frame, an engine and drive system supported by said main frame to supply motive power, an operator's cab supported on said main frame, said cab generally formed as a rectangular box-like structure with a top assembly and an opposing bottom assembly, first and second opposing side panel assemblies, a front panel assembly and an opposing rear panel assembly, said bottom, side and front panel assemblies forming two front corners, said bottom, side and rear panel assemblies forming two rear corners, and a cab mounting and suspension system comprising:

first and second pivoting elastomeric, mounts interconnecting said bottom assembly of said cab, one adjacent each of said two front corners, to said main frame, each said first and second pivoting mounts having an upper elastomeric portion and an integral lower elastomeric portion, each said portion further having a central axis wherein said upper elastomeric portion and said lower elastomeric portion are integrally formed and said central axes are angled with respect to one another, said lower elastomeric portion connected to said main frame, said lower elastomeric portion further having opening therethrough, said opening being disposed along an axis generally offset from and parallel to said central axis in said lower elastomeric portion and generally parallel to a line generally parallel to said two front corners, said elastomeric mounts constructed so as to allow flexure of the mounts in substantially any direction, especially pivotal;

first and second yokes rigidly affixed to said main frame, one adjacent each of said two front corners, with a pin extending through respective each said off-center opening connecting said first and second pivoting mounts to respective yokes; and first and second shock absorber mechanisms interconnecting said bottom assembly of said cab, one adjacent each of said two rear corners, to said main frame.

11. The windrower of claim 10, further including:
a stabilizer bar having first and second opposing ends, said first end of said stabilizer bar pivotably attached to the rear panel assembly of said cab adjacent said first shock absorber mechanism and said second end of said stabilizer bar pivotably attached to said main frame adjacent said second shock absorber mechanism.

12. The windrower of claim 10, wherein:
each said first and second shock absorber mechanism includes a coil-over shock absorber.

13. The windrower of claim 12, wherein:
said elastomeric mounts comprise rubber.

\* \* \* \* \*